A. KLEIN & J. POSS.
TROLLEY FINDER.
APPLICATION FILED JULY 1, 1912.
1,058,761.
Patented Apr. 15, 1913.
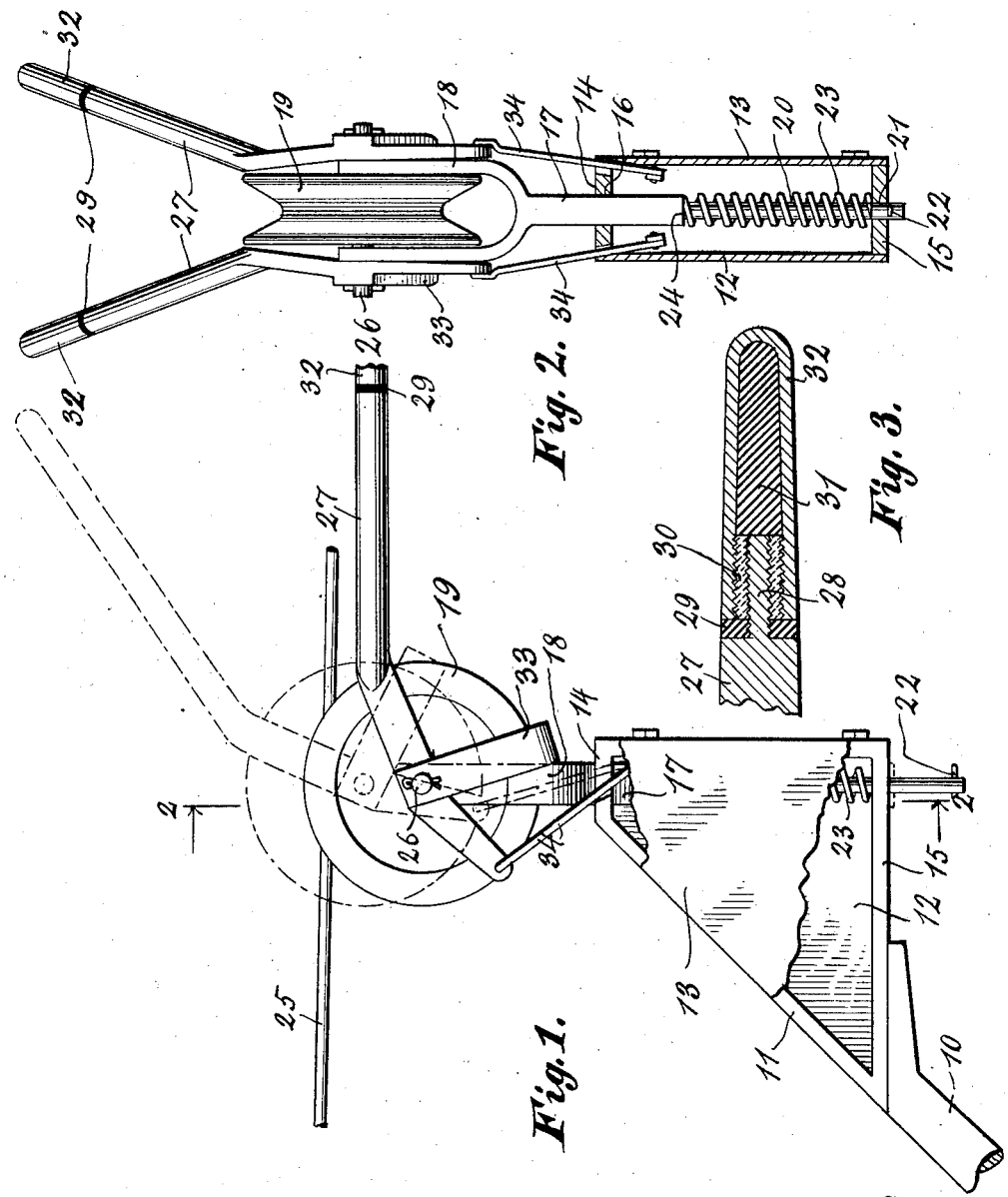
Witnesses
Einar Larson
Ma Schmidt
Inventor
Adam Klein and
John Poss
By Eugene B. Stevens
Attorney

UNITED STATES PATENT OFFICE.

ADAM KLEIN AND JOHN POSS, OF CHICAGO, ILLINOIS.

TROLLEY-FINDER.

1,058,761.   Specification of Letters Patent.   Patented Apr. 15, 1913.

Application filed July 1, 1912. Serial No. 706,965.

*To all whom it may concern:*

Be it known that we, ADAM KLEIN and JOHN POSS, subjects of the Emperor of Austria-Hungary, residing at Chicago, in the county of Cook and State of Illinois, have invented certain new and useful Improvements in Trolley-Finders, of which the following is a specification.

This invention has for its object to provide a novel and improved device for facilitating the engagement of a trolley-wheel with its wire.

The invention also has for its object to provide a device of the kind stated which automatically comes into operative position when the trolley-wheel leaves the wire, and which swings back into inoperative position, out of the way of cross-overs or other obstructions, as soon as the wheel is back on the wire.

With these objects in view, the invention consists in a combination and arrangement of parts to be hereinafter described and claimed, reference being had to the accompanying drawings, in which—

Figure 1 is a side elevation of the invention, partly broken away. Fig. 2 is an end view, partly in section on the line 2—2 of Fig. 1, showing the finder in operative position. Fig. 3 is a sectional detail of the extremity of one of the finder arms.

Referring specifically to the drawing, 10 denotes a fragment of a trolley-pole, the upper end or head of which is a trapezoidal frame 11 closed on one side by a sheet-metal cover 12, and on the other side by a door 13. These parts form a housing which incloses a spring and other parts to be presently described. The top and bottom portions 14 and 15 of the frame are horizontal and parallel. In the top 14 is an aperture 16 through which extends the shank 17 of a fork 18 which carries the trolley-wheel 19. That portion of the shank which passes through the aperture 16 is angular in cross-section and the aperture corresponds thereto, in view of which, it will be seen that the fork is prevented from rotating. The lower end of the shank has a reduced extension 20 which is round in cross-section and passes through an aperture 21 in the bottom 15 of the frame and in alinement with the aperture 16. Below the frame bottom 15, the shank extension carries a cotter-pin 22 to hold the shank from slipping up out of the frame. The fork shank is loose in the apertures and is free to slide up or down. A spring 23 is coiled around the part 20, between the bottom 15 of the frame, and a shoulder 24 at the junction of the parts 20 and 17. This spring tends to push the fork upward and yieldingly holds the wheel in contact with the trolley-wire 25.

Pivoted on the axle 26 of the trolley-wheel 19, on the outside of the fork 18, are two finder arms 27 having one of their ends flat and lying close to the sides of the trolley-wheel. The other ends of the arms diverge and are round in cross-section, their extremities being reduced and threaded to form screw-shanks 28 over which latter is slipped a washer 29 of suitable insulating material, such as fiber or vulcanite. On the shank 28, against the washer 29, is screwed a porcelain sleeve 30 on the outer end of which latter rests a vulcanite pillar 31. The sleeve 30 is externally threaded to receive a hollow tip 32 which incloses the pillar 31. The inner end of the tip is in contact with the washer 29. By this structure the tip 32 is insulated from the finder arms 27. To hold the arms 27 in parallel relation, a brace 33 is provided which is secured to both arms and extends outward therefrom a sufficient distance to clear the trolley-wheel 19.

To the inner ends of the arms 27 is made fast one end of a wire 34, the other end of which is fastened to the frame 11. This connection is provided for swinging the arms 27. When the trolley-wheel 19 is placed on the wire, the fork 18 slides downward against the tension of the spring 23. This brings that end of the wire 34 which is fastened to the arms 27 closer to the end which is fastened to the frame 11, resulting in the wire slackening and allowing the arms to swing down until they extend horizontally, or substantially so, below the trolley wire, and out of the way of obstructions. When the wheel slips off the trolley wire, the spring 23 pushes the fork upward, whereby the wire 34 is drawn taut and the arms 27 are swung on their pivot to come into erect position on opposite sides of the trolley wire, as shown by dotted lines in Fig. 1 and in full lines in Fig. 2. If the arms, when in this position, should strike an obstruction, they will yield and pass over the same without danger of damage. The brace 33 limits the downward swing of the arms by engaging the shank 17.

It will be seen from the foregoing that the finder arms 27 tend to keep the trolley-wheel 19 on the trolley wire 25, and if the wheel slips off the wire, the arms immediately rise and hold the wire between them. The arms also serve to guide the wire onto the wheel when the latter is being placed on the wire, as they are in upstanding position when the wheel is off the wire.

We claim:

A trolley comprising a head, a spring-pressed fork slidably mounted therein, a wheel journaled in the fork, finder arms pivoted at points between their ends to the fork, links pivotally connected with the finder arms at one side of the fork and with the head at the opposite side of the fork, a brace connected with the finder arms and engageable with the fork at the side thereof opposite the side adjacent which the links are pivotally connected with the finder arms.

In testimony whereof we affix our signatures in presence of two witnesses.

ADAM KLEIN.
JOHN POSS.

Witnesses:
S. J. LEHRER,
H. G. BATCHELOR.

Copies of this patent may be obtained for five cents each, by addressing the "Commissioner of Patents, Washington, D. C."